(12) United States Patent
Lu et al.

(10) Patent No.: US 11,831,145 B2
(45) Date of Patent: Nov. 28, 2023

(54) CURRENT SENSING PROTECTION DEVICE FOR SENSING WHETHER CURRENT SENSING ELEMENT OCCURS SHORT PHENOMENON

(71) Applicant: HONGKONG DERUN MICROELECTRONICS CO., LTD., Kwai Chung (HK)

(72) Inventors: Wu-Lin Lu, New Taipei (TW); Chiung-Ying Peng, Taipei (TW)

(73) Assignee: HONGKONG DERUN MICROELECTRONICS CO., LTD., Kwai Chung (HK)

( * ) Notice: Subject to any disclaimer, the term of this patent is extended or adjusted under 35 U.S.C. 154(b) by 27 days.

(21) Appl. No.: 17/719,725

(22) Filed: Apr. 13, 2022

(65) Prior Publication Data

US 2022/0407305 A1    Dec. 22, 2022

(30) Foreign Application Priority Data

Jun. 18, 2021 (CN) .......................... 202110676047.X

(51) Int. Cl.
*H02H 3/16* (2006.01)
*H02H 1/00* (2006.01)

(52) U.S. Cl.
CPC ............ *H02H 3/16* (2013.01); *H02H 1/0007* (2013.01)

(58) Field of Classification Search
CPC ........ H02H 1/0007; H02H 3/08; H02H 3/087; H02H 3/16; H02H 3/26; H02H 7/12; H02H 7/1227; H02H 9/046; H02M 1/32
See application file for complete search history.

(56) References Cited

U.S. PATENT DOCUMENTS

| | | | |
|---|---|---|---|
| 2005/0052797 A1* | 3/2005 | Yan | H02H 3/025 361/18 |
| 2020/0059083 A1* | 2/2020 | Li | H02H 3/093 |
| 2020/0119540 A1* | 4/2020 | Buhari | H03K 17/08122 |
| 2020/0274346 A1* | 8/2020 | Ding | H02H 5/042 |
| 2020/0303916 A1* | 9/2020 | Ontiveros | H02H 3/16 |
| 2021/0408780 A1* | 12/2021 | Scheel | G01R 31/52 |

\* cited by examiner

*Primary Examiner* — Jared Fureman
*Assistant Examiner* — Nicolas Bellido
(74) *Attorney, Agent, or Firm* — McClure, Qualey & Rodack, LLP

(57) ABSTRACT

A current sense short protection circuit includes a switch unit, a current sensing unit, a detection circuit and a short detection module. The first terminal of the switch unit receives a first voltage. The control terminal of the switch unit receives a control signal. The first terminal of the current sensing unit is coupled to the second terminal of the switch unit. The second terminal of the current sensing unit receives a second voltage. The detection unit receives the second voltage and a third voltage provided by the first terminal of the current sensing unit, and generates a detection signal according to the second voltage and the third voltage. The short detection module receives the first voltage, the second voltage and the detection signal, and generates a short detection signal according to the first voltage, the second voltage and the detection signal.

8 Claims, 4 Drawing Sheets

CURRENT SENSING PROTECTION DEVICE FOR SENSING WHETHER CURRENT SENSING ELEMENT OCCURS SHORT PHENOMENON

CROSS REFERENCE TO RELATED APPLICATIONS

This application claims priority of China Patent Application No. 202110676047.X, filed on Jun. 18, 2021, the entirety of which is incorporated by reference herein.

BACKGROUND OF THE INVENTION

Field of the Invention

An embodiment of the present invention relates to a current sensing protection device combined with a current sense short protection circuit.

Description of the Related Art

In recent years, more and more electronic devices use universal series bus type-C (USB Type-C) ports for data transmission and power supply. In addition to serving as a simple transmission interface, the USB Type C port also supports two-way plugging. Therefore, the USB Type C port may prevent plugging in the wrong direction, may further provide high-current charging, and is also suitable for outputting the image frame.

Since the output of high current has become the future trend, the current detection path of the bus power pin of the USB Type C port is relatively important. If the current flowing through the bus power pin is too large, it may cause serious damage to the switch circuit and the components connected thereto. In addition to electrostatic discharge (ESD) protection, the USB Type C port needs to have an overcurrent protection device to detect overcurrent. Therefore, the overcurrent protection device is quite an important component. However, in an electronic application, the overcurrent protection device may short out, thereby causing excessive current that could damage electronic components. If there is a detection circuit that can detect short circuits and stop them from happening at any time, it will make the overcurrent protection device more secure and reliable.

BRIEF SUMMARY OF THE INVENTION

An embodiment of the present invention provides a current sense short protection circuit, thereby effectively sensing whether the current sensing element occurs a short phenomenon and increasing the safety of use.

An embodiment of the present invention provides a current sense short protection circuit, which includes a switch unit, a current sensing unit, a detection unit and a short detection module. The switch unit has a first terminal, a second terminal and a control terminal. The first terminal of the switch unit receives a first voltage. The control terminal of the switch receives a control signal. The current sensing unit has a first terminal and a second terminal. The first terminal of the current sensing unit is coupled to the second terminal of the switch unit. The second terminal of the current sensing unit receives a second voltage. The detection unit is coupled to the first terminal of the current sensing unit and the second terminal of the current sensing unit. The detection unit receives the second voltage and a third voltage provided by the first terminal of the current sensing unit, and generates a detection signal according to the second voltage and the third voltage. The short detection module is coupled to the first terminal of the switch unit, the second terminal of the current sensing unit and the detection unit. The short detection module receives the first voltage, the second voltage and the detection signal, and generates a short detection signal according to the first voltage, the second voltage and the detection signal.

According to the current sense short protection circuit disclosed by the present invention, the detection unit detects the second voltage of the second terminal of the current sensing unit and the third voltage of the first terminal of the current sensing unit, and generates the detection signal according to the second voltage of the second terminal of the current sensing unit and the third voltage of the first terminal of the current sensing unit. The short detection module receives the first voltage of the first terminal of the switch unit, the second voltage of the second terminal of the current sensing unit and the detection signal of the detection unit, and generates the short detection signal according to the first voltage, the second voltage and the detection signal. Therefore, it may effectively detect whether the current sensing unit occurs a short phenomenon or an abnormal phenomenon and increase the safety of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference number represents an element or component that is the same or similar.

Figure 1:
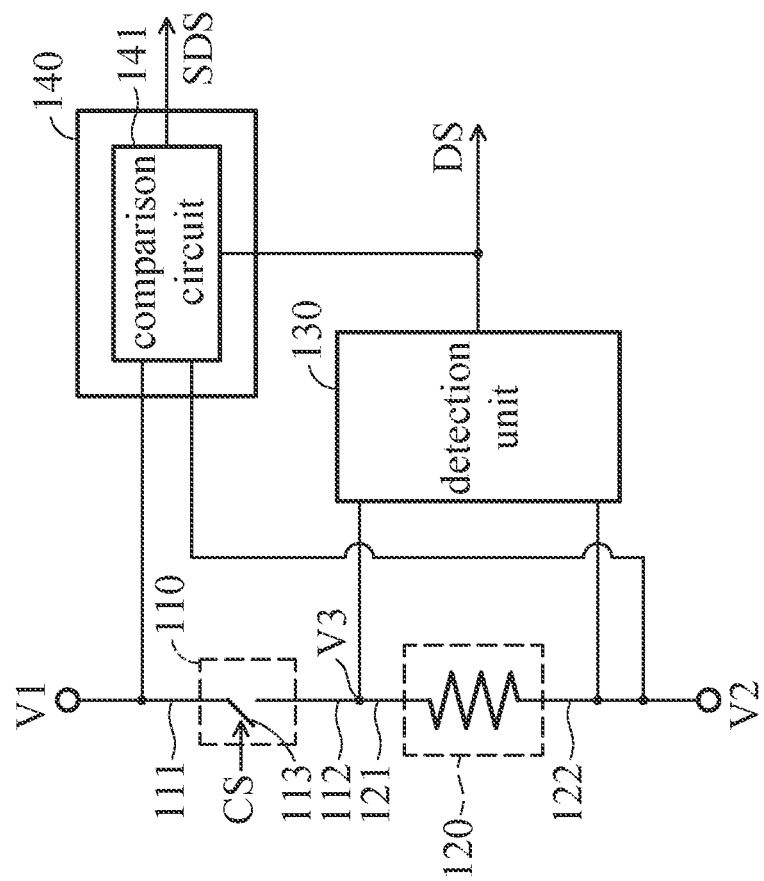
FIG. 1 is a schematic view of a current sense short protection circuit according an embodiment of the present invention.

FIG. 1 is a schematic view of a current sense short protection circuit according an embodiment of the present invention. Please refer to FIG. 1. The current sense short protection circuit 100 includes a switch unit 110, a current sensing unit 120, a detection unit 130 and a short detection module 140.

The switch unit 110 has a first terminal 111, a second terminal 112 and a control terminal. The first terminal 111 of the switch unit 110 may receive a first voltage V1. The control terminal 113 of the switch unit 110 may receive a control signal CS, and the switch unit 110 may be turned on or turned off according to a signal level of the control signal CS. In the embodiment, the switch unit 110 may be a transistor, such as a metal oxide semiconductor field effect transistor (MOSFET) or a bipolar transistor, but the embodiment of the present invention is not limited thereto. In some embodiments, the switch unit 110 may also be formed of two transistor connected in series.

The current sensing unit 120 has a first terminal 121 and a second terminal 122. The first terminal 121 of the current sensing unit 120 is coupled to the second terminal 112 of the switch unit 110. The second terminal 122 of the current sensing unit 120 receives a second voltage V2.

In some embodiments, the first voltage V1 is, for example, a system voltage (such as VIN) of a system circuit, and the second voltage V2 is, for example, a bus voltage (such as VBUS) of a transmission port. In addition, the current sensing unit 120 is usually a precision resistor, and used to sense the current from the first voltage V1 to the second voltage V2, but the embodiment of the present invention is not limited thereto. In some embodiments, the first voltage V1 is, for example, the bus voltage (such as VBUS) of the transmission port (such as a power pin of the bus), and the second voltage V2 is, for example, the system voltage (such as VIN) of the system circuit. In addition, the current sensing unit 120 may be used to sense the current from the second voltage V2 to the first voltage V1.

The detection unit 130 is coupled to the first terminal 121 of the current sensing unit 120 and the second terminal 122 of the current sensing unit 120. The detection unit 130 receives the second voltage V2 and a third voltage V3 provided by the first terminal 121 of the current sensing unit 120, and generates a detection signal DS according to a voltage difference signal generated by the second voltage V2 and the third voltage V3.

The short detection module 140 is coupled to the first terminal 111 of the switch unit 110, the second terminal 122 of the current sensing unit 120 and the detection unit 130. The short detection module 140 receives the first voltage V1, the second voltage V2 and the detection signal DS generated by the detection unit 130, and generates a short detection signal SDS according to the voltage difference signal generated by the first voltage V1 and the second voltage V2 combined with the detection signal DS generated by the detection unit 130.

Furthermore, the short detection module 140 may include a comparison circuit 141. The comparison circuit 141 may determine whether to start an operation of comparing the first voltage V1 and the second voltage V2 according to the signal state of the detection signal DS, so as to generate a short detection signal SDS. For example, when the voltage difference between the second voltage V2 and the third voltage V3 in the detection signal DS is a predetermined voltage difference or higher than the predetermined voltage difference, the comparison circuit 141 may not start the operation of comparing the first voltage V1 and the second voltage V2. When the voltage difference between the second voltage V2 and the third voltage V3 in the detection signal DS is lower than the predetermined voltage difference, it indicates that the current sensing unit 120 may occur the short phenomenon or an abnormal phenomenon. Then, the comparison circuit 141 may start the operation of comparing the first voltage V1 and the second voltage V2.

For example, the comparison circuit 141 may compare the first voltage V1 with the second voltage V2 to calculate the voltage difference (such as |V1−V2|) between the first voltage V1 and the second voltage V2, and determine whether the above voltage difference is the predetermined voltage difference, so as to generate a short detection signal SDS. In the embodiment, the above predetermined voltage difference is, for example, a sum of the voltage difference corresponding to the switch unit 110 and the voltage difference corresponding to the current sensing unit 120 combined with the detection signal DS generated by the detection unit 130, but the embodiment of the present invention is not limited thereto. The user may adjust the value of the above predetermined voltage difference according to the requirements thereof, and the same effect may be achieved.

When the comparison circuit 141 determines that the above the voltage difference is lower than the predetermined voltage difference and the detection signal DS generated by the detection unit 130 is at a low logic level, it indicates that the current sensing unit 120 does not occur the short phenomenon or is normal. Then, the comparison 141 generates, for example, the short detection signal SDS with the low logic level to the system circuit, such that the system circuit may know that the current sensing unit 120 does not occur the short phenomenon.

When the comparison circuit 141 determines that the above voltage difference is equal to the predetermined voltage difference or higher than the predetermined voltage difference and the detection signal DS generated by the detection unit 130 is at a high logic level, it indicates that the current sensing unit 120 occurs the short phenomenon or is abnormal. Then, the comparison circuit 141 generates, for example, the short detection signal SDS with the high logic level to the system circuit, such that the system circuit may know that the current sensing unit 120 has been occurred the short phenomenon, and the system circuit may issue an alarm signal to inform the user that the current sensing unit 120 occurs the short phenomenon. Afterward, the user may perform the subsequent operation, such as replacement or maintenance of the current sensing unit 120. Therefore, it may effectively detect whether the current sensing unit 120 (the circuit element) occurs the short phenomenon or the abnormal phenomenon, and increase the safety of use.

Figure 2:
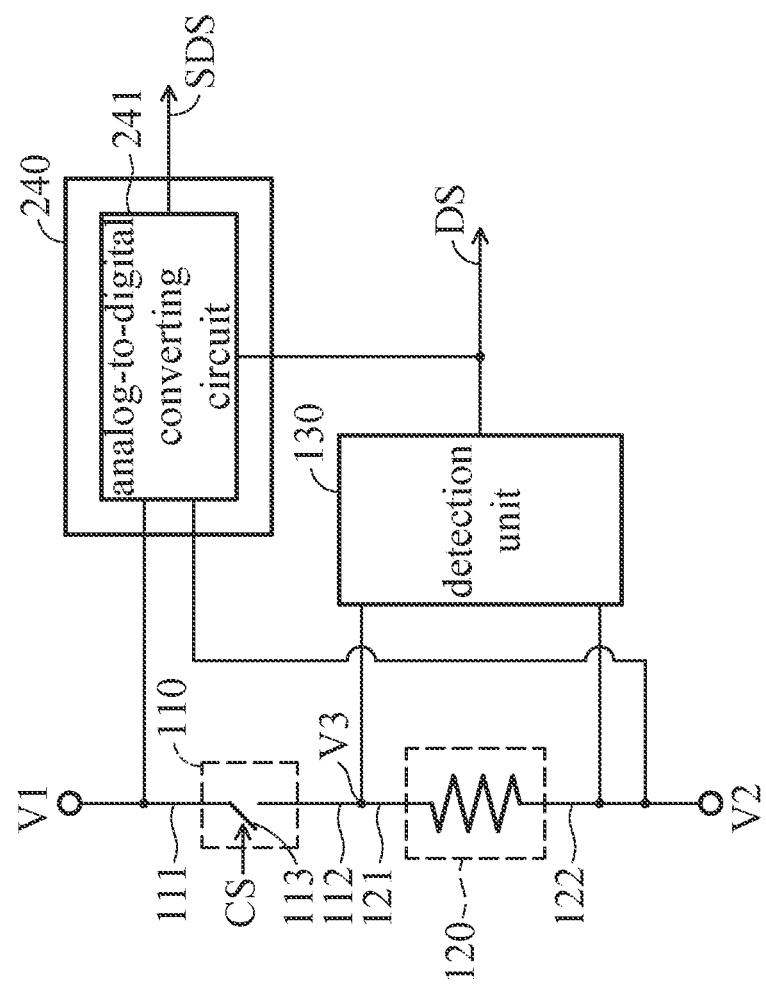
FIG. 2 is a schematic view of a current sense short protection circuit according another embodiment of the present invention.

FIG. 2 is a schematic view of a current sense short protection circuit according another embodiment of the present invention. Please refer to FIG. 2. The current sense short protection circuit 200 includes a switch unit 110, a current sensing unit 120, a detection unit 130 and a short detection module 240. In the embodiment, the switch unit 110, the circuit sensing unit 120 and the detection unit 130 in FIG. 2 are equal to or similar to the switch unit 110, the current sensing unit 120 and the detection unit 130 in FIG. 1. Accordingly, the switch unit 110, the circuit sensing unit 120 and the detection unit 130 in FIG. 2 may refer to the description of the embodiment of FIG. 1, and the description thereof is not repeated herein.

The short detection module 240 is coupled to the first terminal 111 of the switch unit 110 and the second terminal 122 of the current sensing unit 120. The short detection module 240 receives the first voltage V1 and the second voltage V2, and generates the short detection signal SDS according to the voltage difference signal generated by the first voltage V1 and the second voltage V2 combined with the detection signal DS generated by the detection unit 130.

Furthermore, the short detection module 240 may include an analog-to-digital converting circuit 241. The analog-to-digital converting circuit 241 may determine whether to start an operation of converting and comparing the first voltage V1 and the second voltage V2 according to the signal state of the detection signal DS, so as to generate a short detection signal. For example, when the voltage difference between the second voltage V2 and the third voltage V3 in the detection signal DS is a predetermined voltage difference or higher than the predetermined voltage difference, the analog-to-digital converting circuit 241 may not start the operation of converting and comparing the first voltage V1 and the second voltage V2. When the voltage difference between the second voltage V2 and the third voltage V3 in the detection signal DS is lower than the predetermined voltage difference, it indicates that the current sensing unit 120 may occur the short phenomenon or the abnormal phenomenon. Then, the analog-to-digital converting circuit 241 may start the operation of converting and comparing the first voltage V1 and the second voltage V2. Furthermore, the analog-to-digital converting circuit 241 may perform an analog-to-digital conversion on the first voltage V1 and the second V2 according to the detection signal DS, and compare the voltage difference ratio between the first voltage V1 and the second voltage V2, so as to generate a short detection signal SDS.

For example, when the voltage difference between the second voltage V2 and the third voltage V3 in the detection signal DS is lower than the predetermined voltage difference, the analog-to-digital converting circuit 241 may perform the analog-to-digital conversion on the first voltage V1 and the second voltage V2 to convert the first voltage V1 and the second voltage V2 into voltage ratios and calculate the voltage difference ratio between the first voltage V1 and the second voltage V2, and the analog-to-digital converting circuit 241 may determine whether the voltage difference ratio is a predetermined voltage difference ratio, so as to generate a short detection signal SDS.

When the analog-to-digital converting circuit 241 determines that the above voltage difference ratio is lower than the predetermined voltage difference ratio and the detection signal DS generated by the detection unit 130 is at a low logic level, it indicates that the current sensing unit 120 does not occur the short phenomenon or is normal. Then, the analog-to-digital converting circuit 241 generates, for example, the short detection signal SDS with the low logic level to the system circuit, such that the system circuit may know that the current sensing unit 120 does not occur the short phenomenon.

When the analog-to-digital converting circuit 241 determines that the above voltage difference ratio is equal to or higher than the predetermined voltage difference ratio and the detection signal DS generated by the detection unit 130 is at a high logic level, it indicates that the current sensing unit 120 occurs the short phenomenon or is abnormal. Then, the analog-to-digital converting circuit 241 generates, for example, the short detection signal SDS with the high logic level to the system circuit, such that the system circuit may know that the current sensing unit 120 has been occurred the short phenomenon, and the system circuit may issue an alarm signal to inform the user that the current sensing unit 120 occurs the short phenomenon. Afterward, the user may perform the subsequent operation, such as replacement or maintenance of the current sensing unit 120. Therefore, it may effectively detect whether the current sensing unit 120 (the circuit element) occurs the short phenomenon or the abnormal phenomenon, and increase the safety of use.

Figure 3:
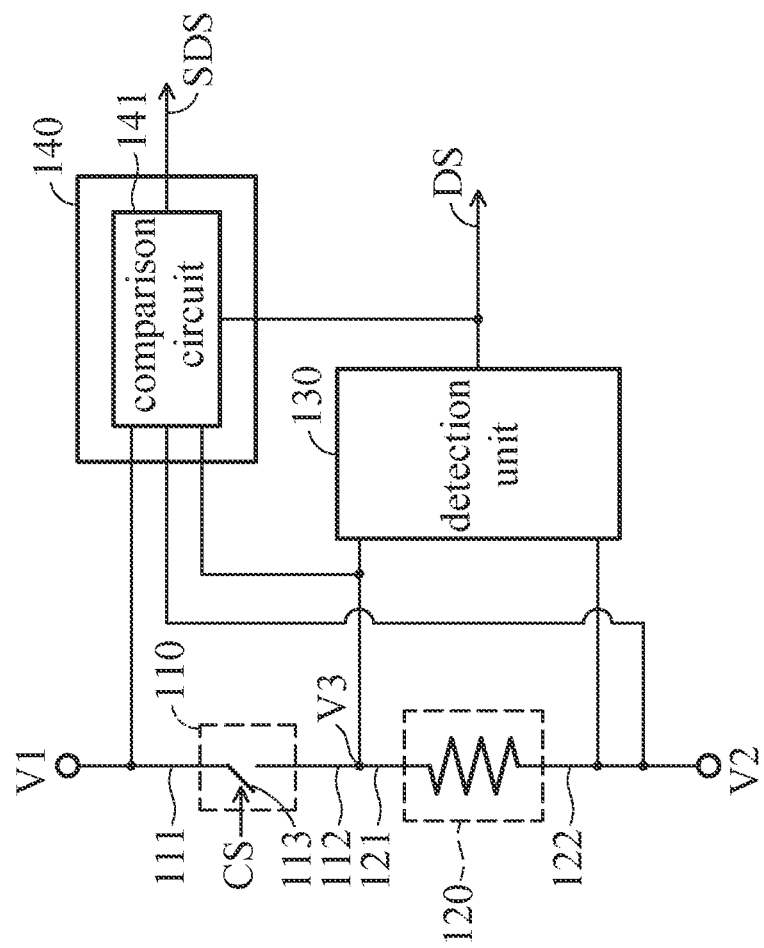
FIG. 3 is a schematic view of a current sense short protection circuit according another embodiment of the present invention.

FIG. 3 is a schematic view of a current sense short protection circuit according another embodiment of the present invention. Please refer to FIG. 3. The current sense short protection circuit 300 includes a switch unit 110, a current sensing unit 120, a detection unit 130 and a short detection module 140. In the embodiment, the switch unit 110, the circuit sensing unit 120, the detection unit 130 and the short detection module 140 in FIG. 3 are equal to or similar to the switch unit 110, the circuit sensing unit 120, the detection unit 130 and the short detection module 140 in FIG. 1. Accordingly, the switch unit 110, the circuit sensing unit 120, the detection unit 130 and the short detection module 140 in FIG. 3 may refer to the description of the embodiment of FIG. 1, and the description thereof is not repeated herein.

In the embodiment, the short detection module 140 (the comparison circuit 141) receives the first voltage V1, the second voltage V2 and the detection signal DS, and the short detection module 140 (the comparison circuit 141) is further coupled to the first terminal 121 of the current sensing unit 120, so as to receive a third voltage V3. In addition, the short detection module 140 (the comparison circuit 141) may generate a short detection signal SDS according to the first voltage V1, the second voltage V2, the third voltage V3 and the detection signal DS. Furthermore, the short detection module 140 (the comparison circuit 141) may determine whether to start of an operation of comparing the first voltage V1, the second voltage V2 and the third voltage V3 according to the signal state of the detection signal DS, so as to generate a short detection signal SDS.

For example, when the voltage difference between the second voltage V2 and the third voltage V3 in the detection signal DS is a predetermined voltage difference or higher than the predetermined voltage difference, the short detection module 140 (the comparison circuit 141) may not start the operation of comparing the first voltage V1, the second voltage V2 and the third voltage V3. When the voltage difference between the second voltage V2 and the third voltage V3 in the detection signal DS is lower than the predetermined voltage difference, it indicates that the current sensing unit 120 may occur the short phenomenon or an abnormal phenomenon. Then, the short detection module 140 (the comparison circuit 141) may start the operation of comparing the first voltage V1, the second voltage V2 and the third voltage V3. Furthermore, the short detection module 140 (the comparison circuit 141) may compare a first voltage difference between the first voltage V1 and the second voltage V2 with a second voltage difference between the second voltage V2 and the third voltage V3, so as to generate a short detection signal SDS.

For example, the short detection module 140 (the comparison circuit 141) may compare the first voltage V1 with the second voltage V2 and the second voltage V2 with the third voltage V3 to calculate the first voltage difference (such as $|V1-V2|$) between the first voltage V1 and the second voltage V2 and the second voltage difference (such as $|V2-V3|$) between the second voltage V2 and the third voltage V3, and determine whether the above first voltage difference and the above second voltage difference are the predetermined voltage difference, so as to generate a short detection signal SDS.

When the short detection module 140 (the comparison circuit 141) determines that the above first voltage difference and the above second voltage difference are the predetermined voltage difference and the detection signal DS generated by the detection unit is at a low logic level, it indicates that the current sensing unit 120 does not occur the short phenomenon or is normal. Then, the short detection module 140 (the comparison circuit 141) generates, for example, the short detection signal SDS with the low logic level to the system circuit, such that the system circuit may know that the current sensing unit 120 does not occur the short phenomenon.

When the short detection module 140 (the comparison circuit 141) determines that the above first voltage difference and the above second voltage difference are equal to or higher than the predetermined voltage difference and the detection signal DS generated by the detection unit 130 is at a high logic level, it indicates that the current sensing unit 120 occurs the short phenomenon or is abnormal. Then, the shot detection module 140 (the comparison 141) generates, for example, the short detection signal SDS with the high logic level to the system circuit, such that the system circuit may know that the current sensing unit 120 has been occurred the short phenomenon, and the system circuit may issue an alarm signal to inform the user that the current sensing unit 120 occur the short phenomenon. Afterward, the user may perform the subsequent operation, such as replacement or maintenance of the current sensing unit 120. Therefore, it may effectively detect whether the current sensing unit 120 (the circuit element) occurs the short phenomenon or the abnormal phenomenon, and increase the safety of use.

Figure 4:
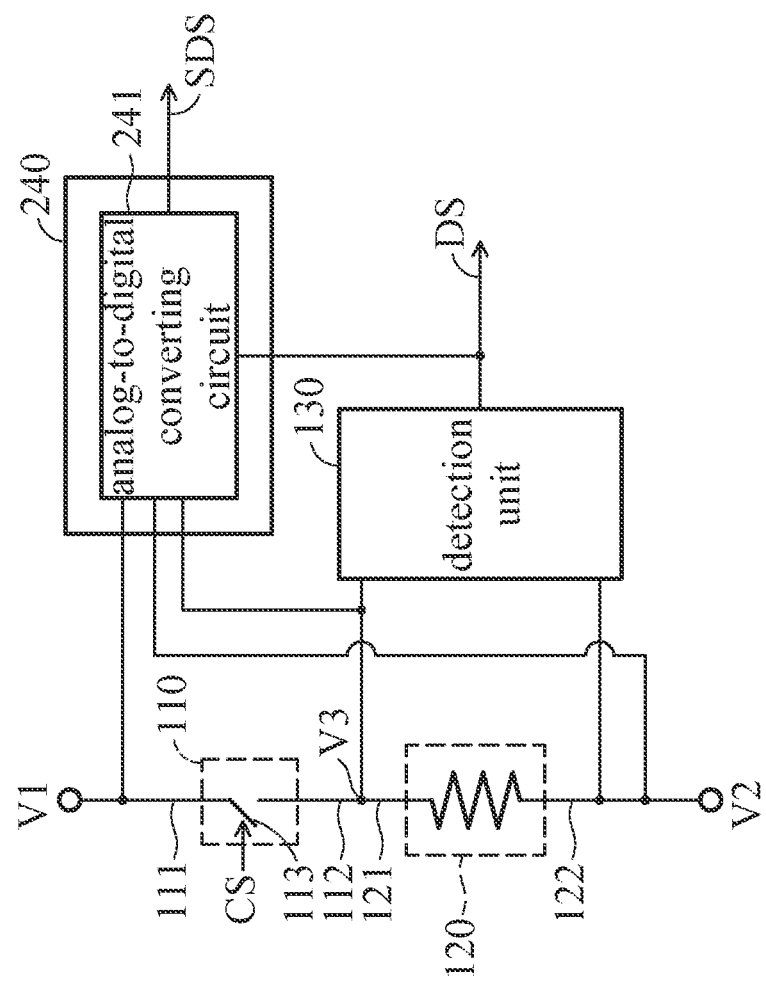
FIG. 4 is a schematic view of a current sense short protection circuit according another embodiment of the present invention.

FIG. 4 is a schematic view of a current sense short protection circuit according another embodiment of the present invention. Please refer to FIG. 4. The current sense short protection circuit 400 includes a switch unit 110, a current sensing unit 120, a detection unit 130 and the short detection module 240. In the embodiment, the switch unit 110, the current sensing unit 120, the detection unit 130 and the short detection module in FIG. 4 are equal to or similar to the switch unit 110, the current sensing unit 120, the detection unit 130 and the short detection module 240 in FIG. 2. Accordingly, the switch unit 110, the current sensing unit 120, the detection unit 130 and the short detection module 240 in FIG. 4 may refer to the description of the embodiment of FIG. 2, and the description thereof is not repeated herein.

In the embodiment, the short detection module 240 (the analog-to-digital converting circuit 241) receives the first voltage V1, the second voltage V2 and the detection signal DS, and the short detection module 240 (the analog-to-digital converting circuit 241) is further coupled to the first terminal 121 of the current sensing unit 120, so as to receive the third voltage V3. In addition, the short detection module 240 (the analog-to-digital converting circuit 241) may generate a short detection signal SDS according to the first voltage V1, the second voltage V2, the third voltage V3 and the detection signal DS. Furthermore, the short detection module 240 (the analog-to-digital converting circuit 241) may determine whether to start an operation of converting and comparing the first voltage V1, the second voltage V2 and the third voltage V3 according to the signal state of the detection signal DS, so as to generate a short detection signal SDS.

For example, when the voltage difference between the second voltage V2 and the third voltage V3 in the detection signal DS is a predetermined voltage difference or higher than the predetermined voltage difference, the short detection module 240 (the analog-to-digital converting circuit 241) may not start the operation of converting and comparing the first voltage V1, the second voltage V2 and the third voltage V3. When the voltage difference between the second voltage V2 and the third voltage V3 in the detection signal DS is lower than the predetermined voltage difference, it indicates that the current sensing unit 120 may occur the short phenomenon or the abnormal phenomenon. Then, the short detection module 240 (the analog-to-digital converting circuit 241) may start the operation of converting and comparing the first voltage V1, the second voltage V2 and the third voltage V3. Furthermore, the short detection module 240 (the analog-to-digital converting circuit 241) may perform an analog-to-digital conversion on the first voltage V1, the second voltage V2 and the third voltage V3 according to the detection signal DS, and compare a first voltage difference ratio between the first voltage V1 and the second voltage V2 and a second voltage difference ratio between the second voltage V2 and the third voltage V3, so as to generate a short detection signal SDS.

For example, when the voltage difference between the second voltage V2 and the third voltage V3 in the detection signal DS is lower than the predetermined voltage difference, the short detection module 240 (the analog-to-digital converting circuit 241) may perform an analog-to-digital conversion on the first voltage V1, the second voltage V2 and the third voltage V3 to convert the first voltage V1, the second voltage V2 and the third voltage V3 into voltage difference ratios and calculate the first voltage difference ratio between the first voltage V1 and the second voltage V2 and the second voltage difference ratio between the second voltage V2 and the third voltage V3, and the short detection module 240 (the analog-to-digital converting circuit 241) may determine whether the above first voltage difference ratio and the above second voltage difference ratio are a predetermined voltage difference ratio, so as to generate a short detection signal SDS.

When the short detection module 240 (the analog-to-digital converting circuit 241) determines that the above first voltage difference ratio and the above second voltage difference ratio are lower than the predetermined voltage difference ratio and the detection signal DS generated by the detection unit 130 is at a low logic level, it indicates that the current sensing unit 120 does not occur the short phenomenon or is normal. Then, the short detection module 240 (the analog-to-digital converting circuit 241) generates, for example, the short detection signal SDS with the low logic level to the system circuit, such that the system circuit may know that the current sensing unit 120 does not occur the short phenomenon.

When the short detection module 240 (the analog-to-digital converting circuit 241) determines that the above first voltage difference ratio and the above second voltage difference ratio are equal to or higher than the predetermined voltage difference ratio and the detection signal DS generated by the detection unit 130 is at a high logic level, it indicates that the current sensing unit 120 occurs the short phenomenon or is abnormal. Then, the short detection module 240 (the analog-to-digital converting circuit 241) generates, for example, the short detection signal SDS with the high logic level to the system circuit, such that the system circuit may know that the current sensing unit 120 has been occurred the short phenomenon, and the system circuit may issue an alarm signal to inform the user that the current sensing unit 120 occurs the short phenomenon. Afterward, the user may perform the subsequent operation, such as replacement or maintenance of the current sensing unit 120. Therefore, it may effectively detect whether the current sensing unit 120 (the circuit element) occurs the short phenomenon or the abnormal phenomenon, and increase the safety of use.

In summary, according to the current sense short protection circuit disclosed by the embodiment of the present invention, the detection unit detects the second voltage of the second terminal of the current sensing unit and the third voltage of the first terminal of the current sensing unit, and generates the detection signal according to the second voltage of the second terminal of the current sensing unit and the third voltage of the first terminal of the current sensing unit. The short detection module receives the first voltage of the first terminal of the switch unit, the second voltage of the second terminal of the current sensing unit and the detection signal of the detection unit, and generates the short detection signal according to the first voltage, the second voltage and the detection signal. In addition, the short detection module of the embodiment of the present invention may further receive the third voltage, and the short detection module may further generate a short detection signal according to the first voltage, the second voltage, the third voltage and the detection signal. Therefore, the smart battery device may be effectively managed, so as to increase lifespan, performance and safety of the battery unit. Therefore, it may effectively detect whether the current sensing unit (the circuit element) occurs the short phenomenon or the abnormal phenomenon, detect overcurrent and increase the safety of use.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A current sense short protection circuit, comprising:
   a switch unit, having a first terminal, a second terminal and a control terminal, wherein the first terminal of the switch unit receives a first voltage, and the control terminal of the switch receives a control signal;
   a current sensing unit, having a first terminal and a second terminal, wherein the first terminal of the current sensing unit is coupled to the second terminal of the switch unit, and the second terminal of the current sensing unit receives a second voltage;
   a detection unit, coupled to the first terminal of the current sensing unit and the second terminal of the sensing unit, wherein the detection unit receives the second voltage and a third voltage provided by the first terminal of the current sensing unit, and generates a detection signal according to the second voltage and the third voltage; and
   a short detection module, coupled to the first terminal of the switch unit, the second terminal of the current sensing unit and the detection unit, wherein the short detection module receives the first voltage, the second voltage and the detection signal, and generates a short detection signal according to the first voltage, the second voltage and the detection signal.

2. The current sense short protection circuit as claimed in claim 1, wherein the short detection module is further coupled to the first terminal of the current sensing unit and the second terminal of the current sensing unit, the short detection module further receives the third voltage, and generates the short detection signal according to the first voltage, the second voltage, the third voltage and the detection signal.

3. The current sense short protection circuit as claimed in claim 2, wherein the short detection module comprises a comparison circuit, the comparison circuit compares a first voltage difference between the first voltage and the second voltage and a second voltage difference between the second voltage and the third voltage, so as to generate the short detection signal.

4. The current sense short protection circuit as claimed in claim 2, wherein the short detection module comprises an analog-to-digital converting circuit, the analog-to-digital converting circuit performs an analog-to-digital conversion on the first voltage, the second voltage and the third voltage according to the detection signal, and compares a first voltage difference ratio between the first voltage and the second voltage to a second voltage difference ratio between the second voltage and the third voltage, so as to generate the short detection signal.

5. The current sense short protection circuit as claimed in claim 1, wherein the short detection module comprises a comparison circuit, the comparison circuit compares a voltage difference between the first voltage and the second voltage according to the detection signal, so as to generate the short detection signal.

6. The current sense short protection circuit as claimed in claim 1, wherein the short detection module comprises an analog-to-digital converting circuit, the analog-to-digital converting circuit performs an analog-to-digital conversion on the first voltage and the second voltage according to the detection signal, and compares a voltage difference ratio between the first voltage and the second voltage, so as to generate the short detection signal.

7. The current sense short protection circuit as claimed in claim 1, wherein the first voltage is a system voltage, and the second voltage is a bus voltage.

8. The current sense short protection circuit as claimed in claim 1, wherein the first voltage is a bus voltage, and the second voltage is a system voltage.

* * * * *